(12) United States Patent
Botkin et al.

(10) Patent No.: US 12,448,986 B2
(45) Date of Patent: Oct. 21, 2025

(54) CEILING FAN WITH QUICK CONNECTION

(71) Applicant: Hunter Fan Company, Memphis, TN (US)

(72) Inventors: Charles William Botkin, Cordova, TN (US); Douglas Troy Mason, Horn Lake, MS (US); Rickey Thomas Jones, Memphis, TN (US)

(73) Assignee: Hunter Fan Company, Memphis, TN (US)

( * ) Notice: Subject to any disclaimer, the term of this patent is extended or adjusted under 35 U.S.C. 154(b) by 25 days.

(21) Appl. No.: 18/581,021

(22) Filed: Feb. 19, 2024

(65) Prior Publication Data
US 2025/0237236 A1 Jul. 24, 2025

Related U.S. Application Data

(63) Continuation-in-part of application No. 18/421,434, filed on Jan. 24, 2024.

(51) Int. Cl.
| | |
|---|---|
| *F04D 29/64* | (2006.01) |
| *F04D 25/06* | (2006.01) |
| *F04D 25/08* | (2006.01) |
| *F21V 17/14* | (2006.01) |
| *F21V 33/00* | (2006.01) |

(52) U.S. Cl.
CPC .......... *F04D 29/646* (2013.01); *F04D 25/06* (2013.01); *F04D 25/088* (2013.01); *F21V 17/14* (2013.01); *F21V 33/0096* (2013.01)

(58) Field of Classification Search
CPC ...... F04D 29/646; F04D 25/088; F04D 25/12; F21V 17/162; F21V 33/0096; F16B 5/10
See application file for complete search history.

(56) References Cited

U.S. PATENT DOCUMENTS

| | | | |
|---|---|---|---|
| 6,171,061 B1 * | 1/2001 | Hsu | F16M 13/027 |
| | | | 416/244 R |
| 8,376,777 B2 | 2/2013 | Smith | |
| 10,641,291 B2 | 5/2020 | Jones et al. | |
| 11,073,166 B2 | 7/2021 | Gorali | |
| 11,320,135 B1 | 5/2022 | Wang | |
| 2012/0183417 A1 * | 7/2012 | Linnenbrock | F04D 29/646 |
| | | | 417/410.1 |
| 2018/0058476 A1 * | 3/2018 | Jones | F04D 25/0693 |
| 2021/0048041 A1 * | 2/2021 | Gorali | F04D 29/601 |

FOREIGN PATENT DOCUMENTS

CN 213879524 U 8/2021

* cited by examiner

*Primary Examiner* — David N Brandt
(74) *Attorney, Agent, or Firm* — McGarry Bair PC

(57) ABSTRACT

A ceiling fan assembly or similar air-moving device can include a motor for rotating one or more blades to drive a volume of air about a space. The ceiling fan assembly comprising multiple assemblies, which, can comprise multiple components. A quick connector can be provided for securing together the multiple assemblies and/or the multiple components.

20 Claims, 7 Drawing Sheets

CEILING FAN WITH QUICK CONNECTION

CROSS-REFERENCE TO RELATED APPLICATION

This application is a continuation in part of U.S. patent application Ser. No. 18/421,434, filed Jan. 24, 2024, which is hereby incorporated herein by reference in its entirety.

FIELD OF THE INVENTION

This application is directed to a ceiling fan, and more specifically, to a ceiling fan having at least two elements assembled by a quick connection.

BACKGROUND

Ceiling fans are machines traditionally suspended from a structure for moving a volume of air about an area. The ceiling fan includes multiple parts, such as assemblies, components, and/or elements, that must be coupled to each other as part of the installation of the ceiling fan. The assembling of the multiple parts has traditionally been accomplished with traditional tools, fasteners, and the like, which is easily handled by an experienced installer, but can be challenging for an inexperienced installer.

BRIEF DESCRIPTION

In one aspect, the disclosure relates to a ceiling fan assembly comprising a motor assembly comprising a stationary motor shaft and a rotor rotationally coupled to the stationary motor shaft for rotation about a rotational axis; a set of blades operably coupled to the rotor; a mounting assembly securing the motor assembly to a structure; a light assembly; and a bayonet mount assembly comprising: a receiver carried by the light assembly, a coupler carried by the stationary motor shaft, wherein the coupler and receiver are relatively rotated between an unlocked position and a locked position about a first axis generally parallel to the rotational axis, and a detent latch having a catch carried by the light assembly and a biased pin, which is moveable in an axial direction along a second axis that is substantially parallel to the first axis and is received in the catch in the locked position.

In another aspect, the disclosure relates to a ceiling fan assembly comprising: a motor assembly comprising a rotor; a set of blades operably coupled to the rotor; a mounting assembly securing the motor assembly to a structure; a light assembly; and a bayonet mount assembly coupling the motor assembly and the light assembly upon relative rotation between an unlocked position and a locked position about a first rotational axis and having a detent latch with a biased pin moveable in a direction along a second axis that is substantially parallel to the first rotational axis.

DETAILED DESCRIPTION

Figure 1:
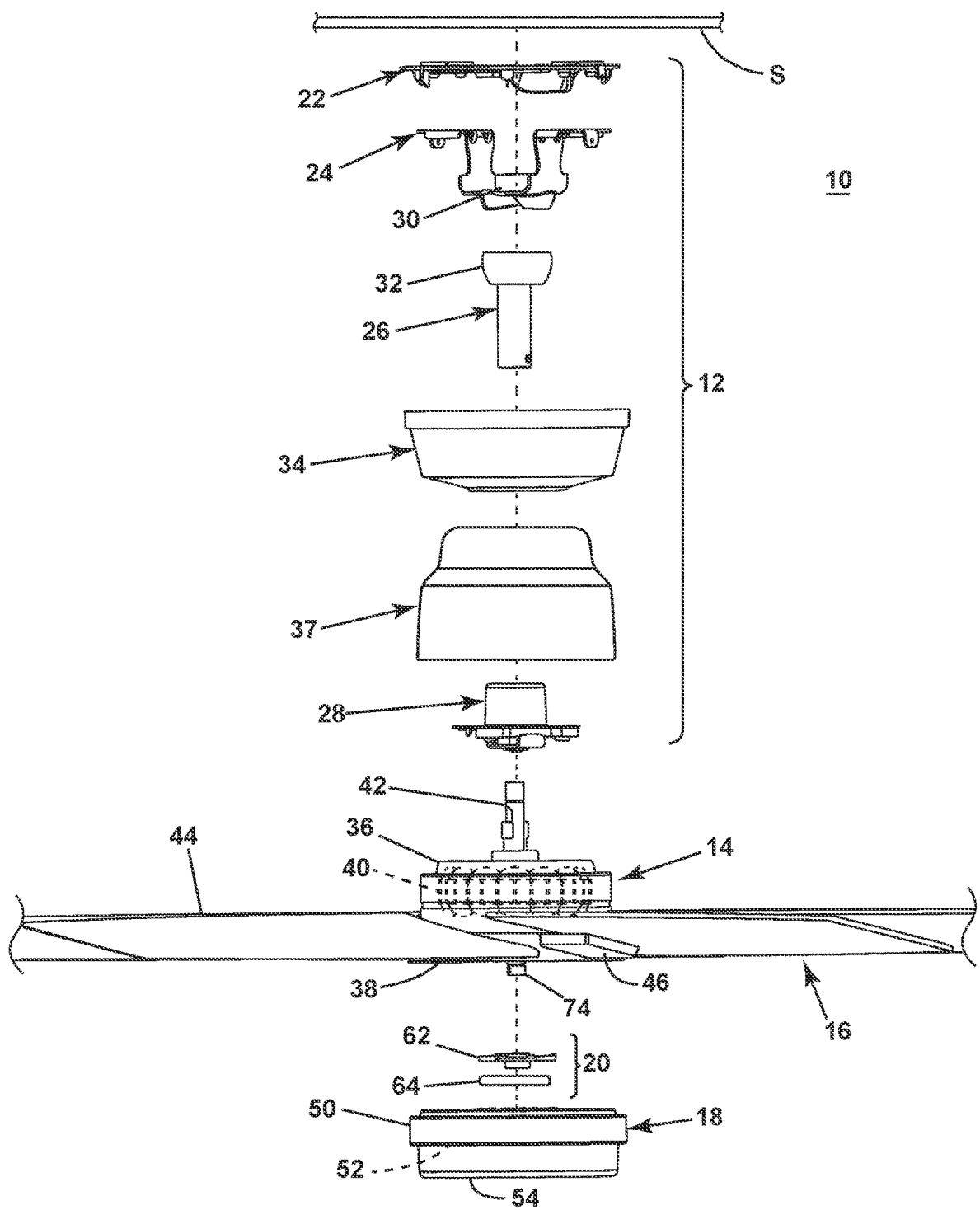
FIG. 1 is a schematic view of a ceiling fan assembly having major elements such as a motor assembly, mounting assembly, light assembly, and blades, which can be coupled by a quick connection assembly.

The disclosure is related to a ceiling fan assembly, a corresponding kit, along with the components forming the assembly or kit. The resulting ceiling fan can be used, for example, in residential and commercial applications. Such applications can be indoors, outdoors, or both. While this description is primarily directed toward a residential ceiling fan, it is also applicable to any environment utilizing fans or for cooling areas utilizing air movement.

As used herein, the term "set" or a "set" of elements can be any number of elements, including only one. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

BRIEF DESCRIPTION OF THE DRAWINGS

In the drawings:

FIG. 1 is a schematic view of a ceiling fan assembly 10 having major elements such as a motor assembly 14, mounting assembly 12, light assembly 18, and blades 44, which can be coupled by a quick connection assembly 20.

Figure 2:
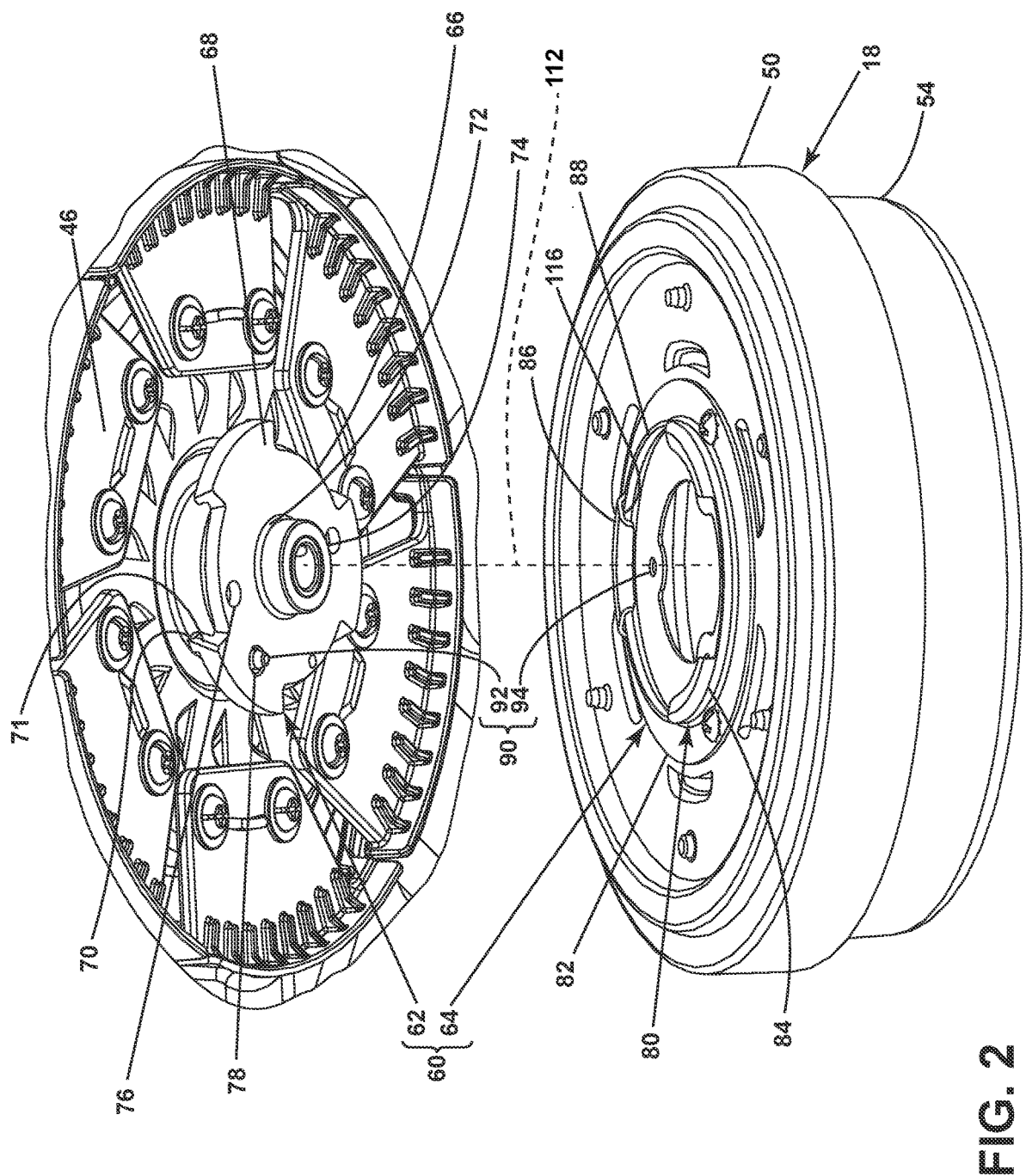
FIG. 2 is a partial exploded view of an exemplary motor assembly and light assembly coupled by an exemplary quick connection assembly in the form of a bayonet mount having a coupler and a receiver, which are locked by a detent latch.

FIG. 2 is a partial exploded view of an exemplary motor assembly 14 and light assembly 18 coupled by an exemplary quick connection assembly 20 in the form of a bayonet mount 60 having a coupler 62 and a receiver 64, which are locked by a detent latch.

Figure 3:
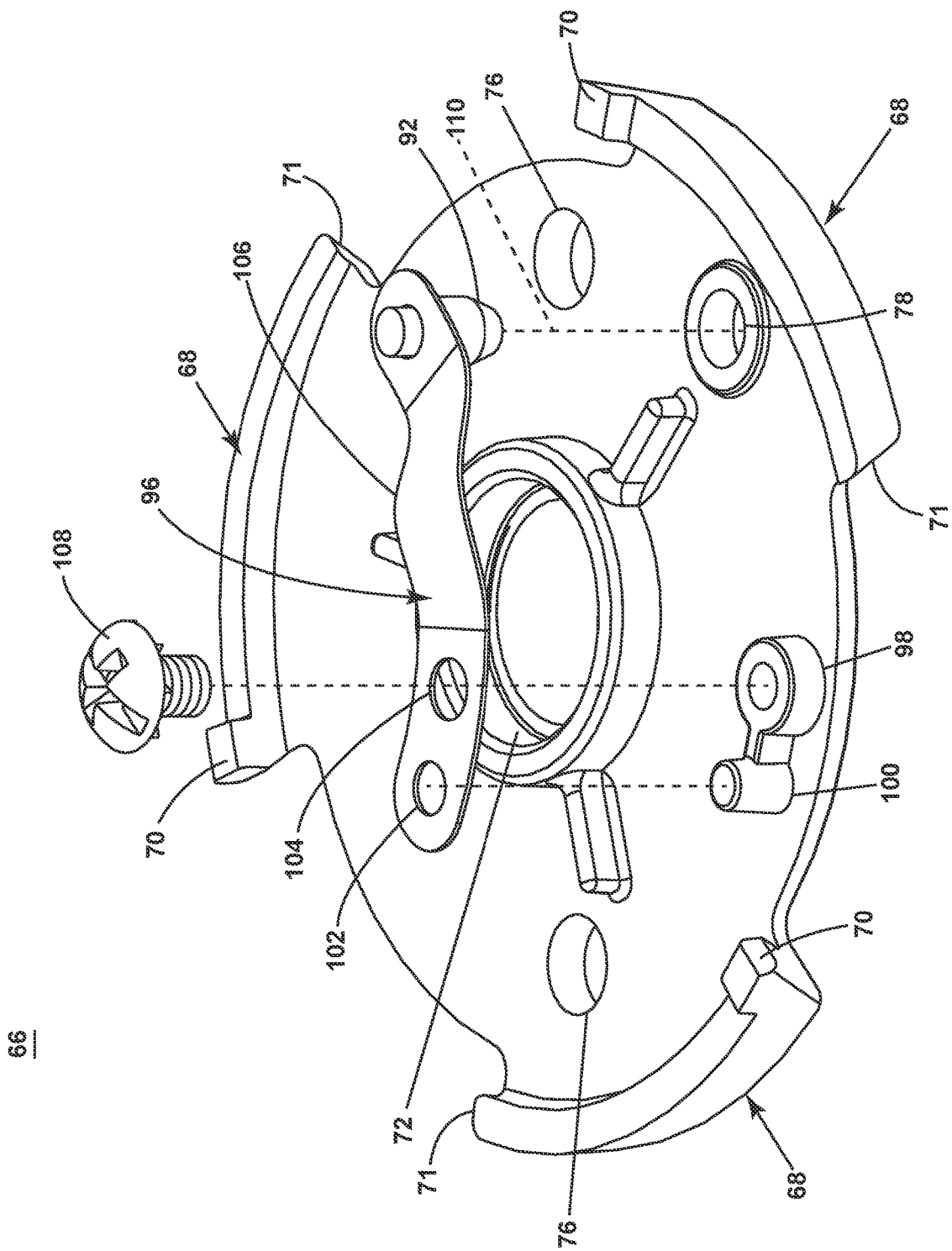
FIG. 3 is a partially-exploded, top perspective view of the coupler of FIG. 2.

FIG. 3 is a partially-exploded, top perspective view of the coupler 62 of FIG. 2.

Figure 4:
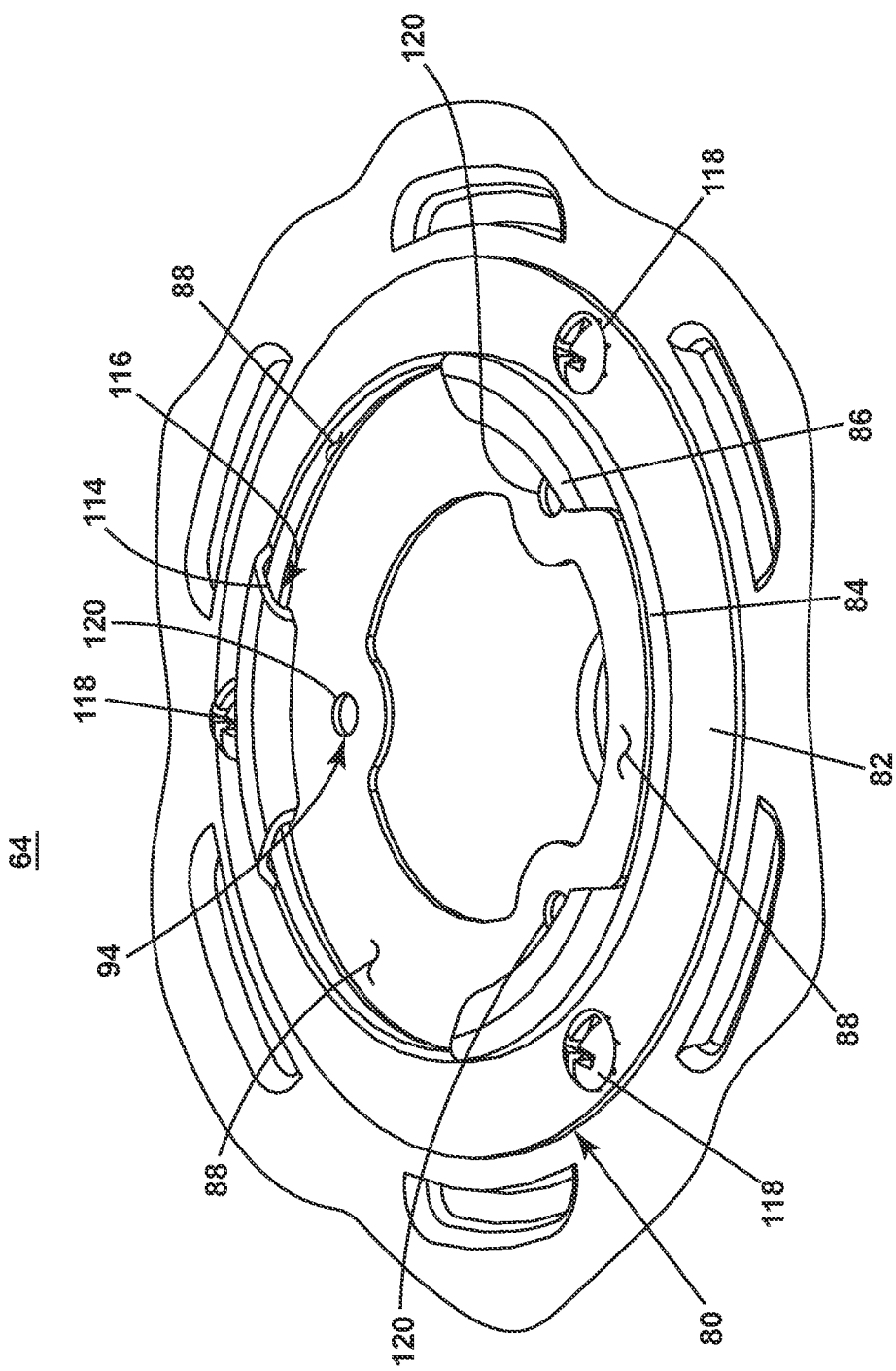
FIG. 4 is a top perspective view of the receiver of FIG. 2.

FIG. 4 is a top perspective view of the receiver 64 of FIG. 2.

Figure 5:
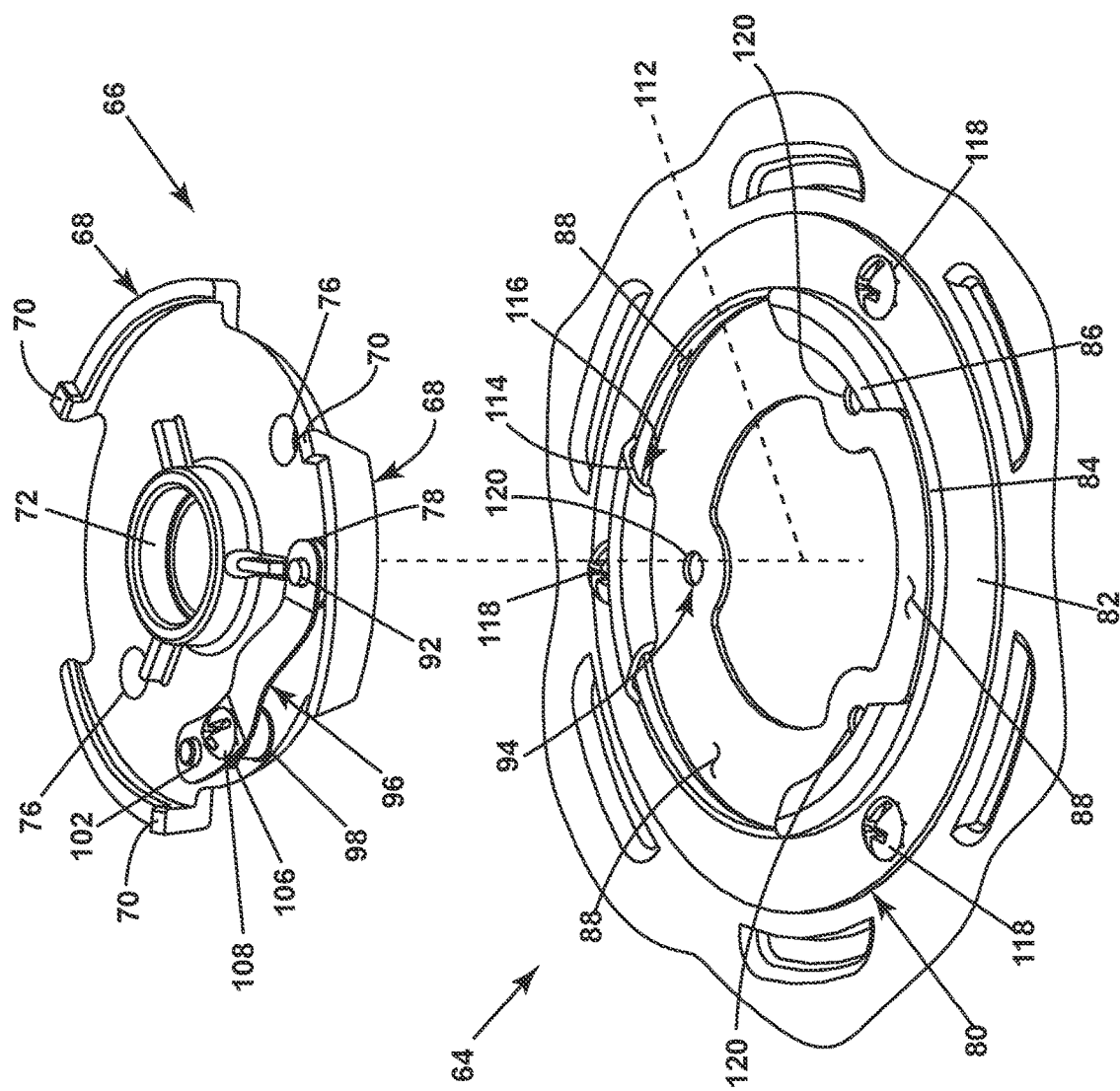
FIG. 5 is a partially exploded view illustrating the coupling of the coupler to the receiver.

FIG. 5 is a partially exploded view illustrating the coupling of the coupler 62 to the receiver 64.

Figure 6:
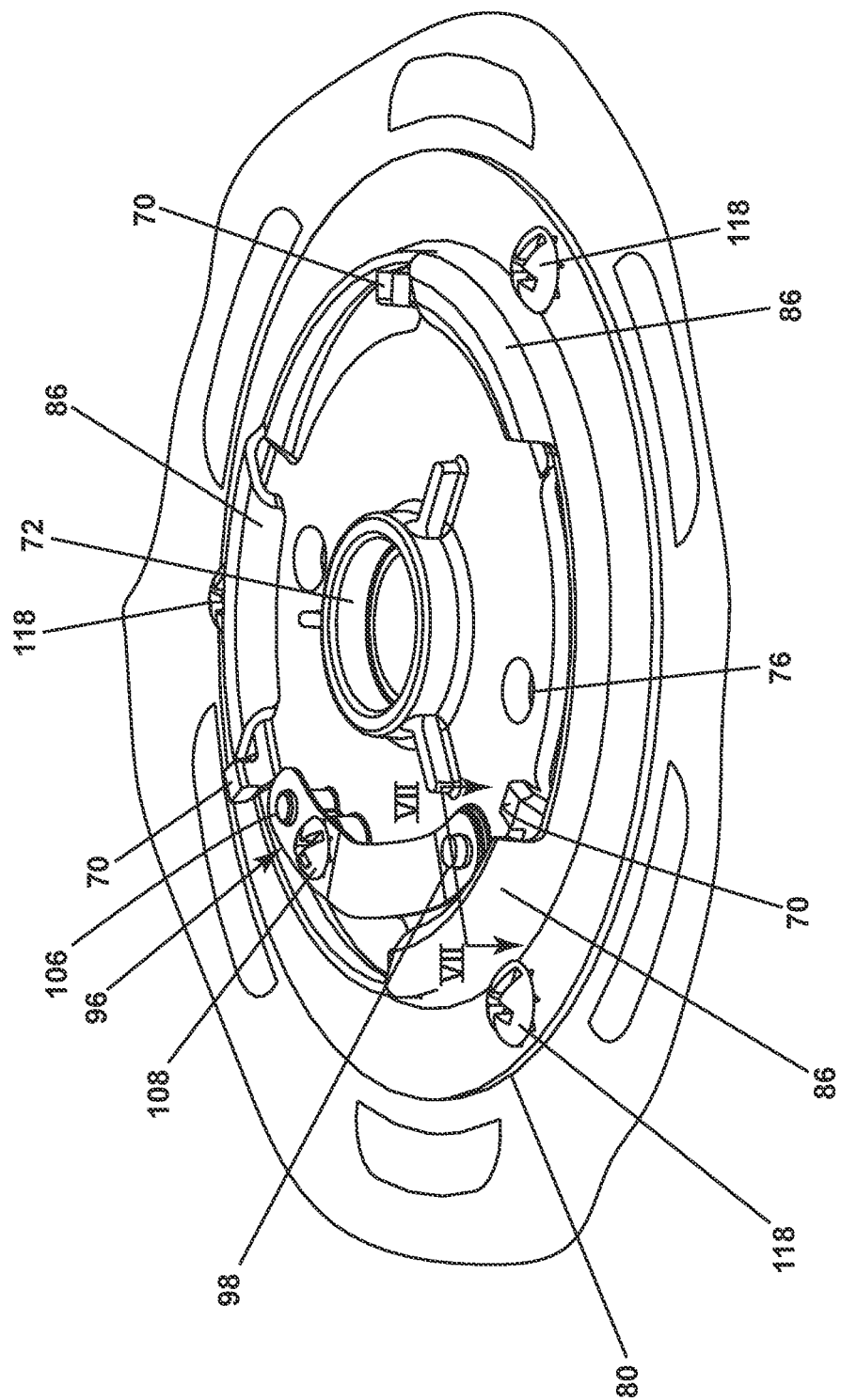
FIG. 6 illustrates the coupler and receiver in a locked and latched position.

FIG. 6 illustrates the coupler 62 and receiver 64 in a locked and latched position.

Figure 7:
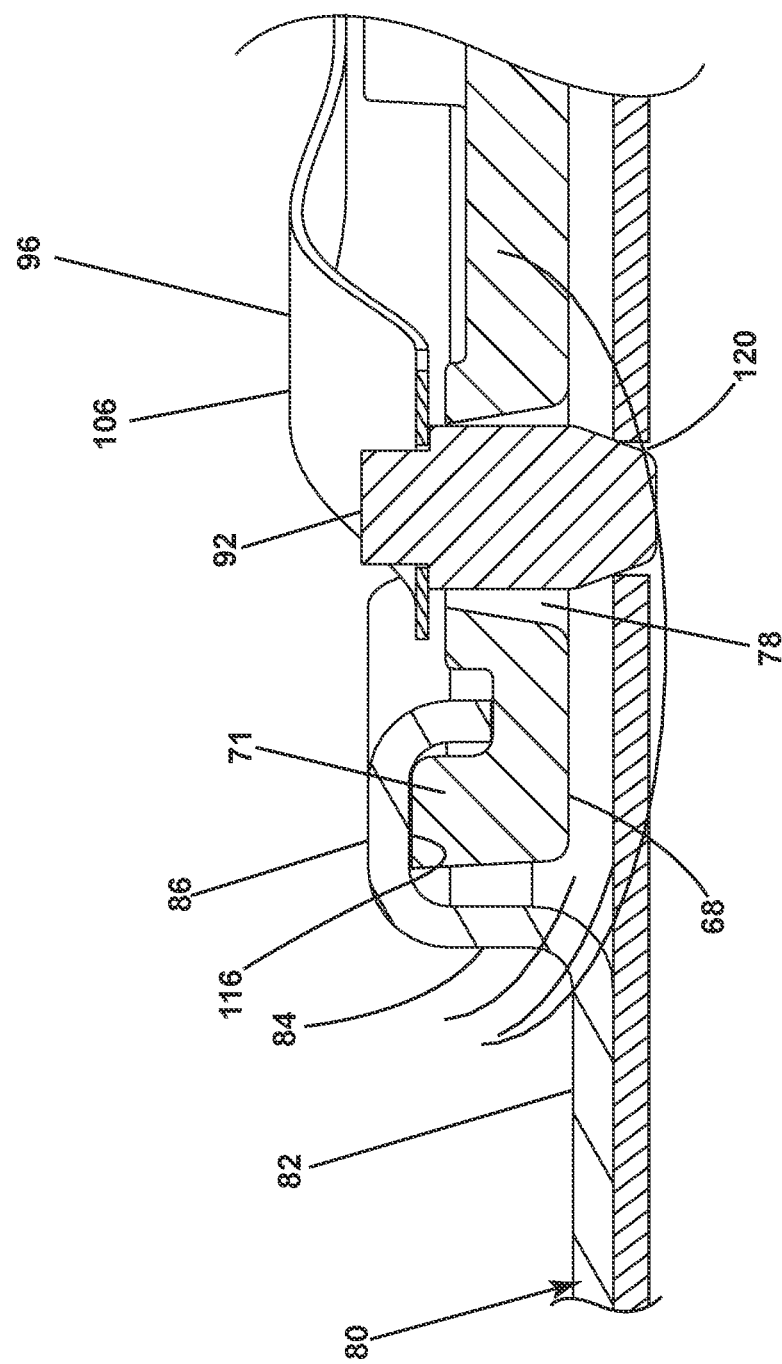
FIG. 7 is a cross-sectional view of a portion of the coupler and receiver in the locked position and illustrating the detent latch in a latched condition.

FIG. 7 is a cross-sectional view of a portion of the coupler 62 and receiver 64 in the locked position and illustrating the detent latch in a latched condition.

DETAILED DESCRIPTION

The disclosure is related to a ceiling fan assembly, a corresponding kit, along with the components forming the assembly or kit. The resulting ceiling fan can be used, for example, in residential and commercial applications. Such applications can be indoors, outdoors, or both. While this description is primarily directed toward a residential ceiling fan, it is also applicable to any environment utilizing fans or for cooling areas utilizing air movement.

As used herein, the term "set" or a "set" of elements can be any number of elements, including only one. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring now to FIG. 1, a ceiling fan assembly 10 is illustrated as being capable of suspension from a structure S. The structure S can be a ceiling. However, it should be understood that the structure S is schematically shown and is by way of example only, and can include any suitable building, structure S, home, business, or other environment wherein moving air with a ceiling fan is suitable or desirable.

The ceiling fan assembly 10 includes a mounting assembly 12, motor assembly 14, blade set 16, and light assembly 18. A connection assembly 20 can be used to secure together any of the mounting assembly 12, motor assembly 14, or light assembly 18, including components within each of the assemblies. While only one connection assembly is shown and described, multiple connection assemblies can be used to secure together multiple assemblies or components.

The mounting assembly 12 can include a mounting bracket 22, a hanger bracket 24, a downrod 26, and a motor adapter 28. The mounting bracket 22 is typically the primary coupling with the structure S. The hanger bracket 24 couples the downrod 26 to the mounting bracket 22 and can be physically integrated with the mounting bracket 22 or mechanically secured to the mounting bracket 22. The hanger bracket 24 can include a ball seat 30 and the downrod 26 can include a ball 32 that is received within the ball seat 30 to secure the downrod 26 to the hanger bracket 24 while permitting pivotal movement of the downrod 26 relative to the hanger bracket 24. The motor adapter 28 can be provided to secure the downrod 26 to the motor assembly 14, which provides an indirect mounting of the downrod 26 to the motor assembly 14 as compared to a direct mounting. A canopy 34 can be provided with the mounting assembly 12 to visually hide the mounting bracket 22 and the hanger bracket 24.

The motor assembly 14 can include a motor 36, which can be enclosed, fully or partially, by an optional motor housing 37. The motor 36 comprises a rotor 38, stator 40, and a motor shaft 42. As illustrated the motor 36 is an external rotor motor, where the rotor 38 circumscribes the stator 40, and the stator 40 is affixed to the motor shaft 42, which is non-rotating. Since the motor shaft 42 is non-rotating, the rotor 38 is rotationally coupled to the non-rotating motor shaft 42, such as by the use of one or more bearing assemblies (not shown). While not shown in the drawings, it is contemplated that the motor 36 could be an internal rotor motor, wherein the rotor is secured to the motor shaft, which rotates with the rotor. Since the internal rotor has a rotating motor shaft, the stator can be connected to the rotating motor shaft by one or more bearing assemblies.

The blade set 16 can have one or more blades 44, which will be connected to the rotor 38, either directly or indirectly by using a blade iron 46. In the case of an internal rotor motor, the blades 44 can be connected by a blade iron 46 or similar structure connected to either the rotor 38 or the rotating motor shaft 42.

The light assembly 18 can include a light housing 50 that carries an illumination source 52, such as an LED light or LED array. Other illumination sources, like traditional light bulbs may also be used instead of or in combination with the LED light source. A globe 54 can be affixed to the light housing 50 and covers the illumination source 52 for aesthetic purposes. The globe 54 can be made of any suitable material, such as glass or plastic, and have any suitable degree of transparency. The light housing 50 can also enclose mechanical or digital switches for turning on/off/dimming of the illumination source 52 and/or controlling the on/off/speed of the motor 36. Thus, the light housing 50 can also be referred to as a switch housing, especially when an illumination source 52 is not included. In a variation where the illumination source 52 is not included, a cover (not shown), including an opaque cover, can be used instead of the globe 54.

Referring to FIG. 2, the connection assembly 20 is illustrated in the form of a bayonet mount 60 securing together the motor assembly 14 and the light assembly 18. The bayonet mount 60 includes a coupler 62 and a receiver 64. The coupler 62 can be received within the receiver 64 to affect the connection. The coupler 62 and receiver 64 can also be relatively locked once the connection is made.

The coupler 62 comprises a body 66 supporting at least one lug 68. As illustrated, the at least one lug 68 comprises multiple, spaced lugs 68. While the spacing can be of any desired amount, as illustrated, the lugs 68 are equally, radially spaced about the body 66. At least one of the lugs 68 is illustrated as optionally having a stop 70, which is illustrated as extending from a key 71.

The body 66 is configured to mount to the motor assembly 14. As illustrated, the body 66 has a tapped opening 72 that is threaded onto a tapped portion 74 of the stationary motor shaft 42. However, the body 66 could be just as easily pressed, instead of threaded, onto the motor shaft 42. Alternatively, the body 66 could be affixed to another portion of the motor assembly 14, such as a portion of the motor housing 37 or stator 40 or blades 44 or blade iron 46.

The body 66 further includes mounting holes 76 that can be used as part of the assembly of the ceiling fan assembly 10. The body 66 can further include a latch opening 78.

The receiver 64 includes a collar 80 that is affixed to or integrated with the light housing 50. The collar 80 has a base 82 from which extends a wall 84 terminating in a lip 86 having at least one lug opening 88. As illustrated, there are multiple lug openings 88, which advantageously have the same spacing as the lugs 68, such that the lugs 68 can be axially inserted through the lug openings 88 to locate the lugs 68 below the lip 86, wherein subsequent relative rotation of the motor assembly 14 and the light assembly 18 will locate the lugs 68 below the lip 86 and secure the light assembly 18 to the motor assembly 14.

A latch assembly 90, illustrated in the form of a detent latch, is provided to lock the bayonet mount 60 and prevent the removal of the light assembly 18 from the motor assembly 14. As illustrated, the detent latch prevents the relative rotation of the light assembly 18 and motor assembly 14.

The latch assembly 90 comprises a biased pin 92 that passes through the latch opening 78 and is received within a catch 94 on the receiver 64. As illustrated the catch 94 is located in a portion of the light housing 50, which forms part of the receiver 64 in the illustrated variation. However, the base 82 could be configured such that it contains the catch 94. A spring finger 96 carried by the coupler 62 provides the biasing force for the biased pin 92. The spring finger 96 is illustrated on the obverse side of the body 66 relative to the receiver 64.

Referring to FIG. 3, the details of the spring finger 96 and its arrangement with the coupler 62 can be seen in greater detail. The coupler 62 includes a tapped embossment 98 and an alignment pin 100 that are used to secure the spring finger 96. The spring finger 96 includes an alignment opening 102 and fastener opening 104, with a pre-sprung portion 106 located between the fastener opening 104 and the biased pin 92. To secure the spring finger 96 to the coupler 62, it is simplest to insert the biased pin 92 into the latch opening 78 and insert the alignment pin 100 into the alignment opening 102. In this position, the fastener opening 104 will align with the tapped embossment 98 and a fastener 108, such as a bolt, is passed through the fastener opening 104 and threaded into the tapped embossment 98 to secure the spring finger 96 to the coupler 62. Once assembled, the biased pin 92 extends through and beyond the latch opening 78 and the pre-sprung portion 106 applies a biasing force to the biased pin 92 that resists its axial movement out of the latch opening 78. It can be seen that the axial movement of the biased pin 92 is along an axis 110 that is generally or substantially parallel to the centerline 112 (FIG. 2) of the non-rotating motor shaft 42, which is also the rotational axis of the motor 36. By generally or substantially parallel, it is meant that the two axes are angularly offset no more than 10 degrees, and more preferably no more than 5 degrees. The embossment 98, alignment pin 100, and alignment opening 102 can have other suitable arrangements. For example, instead of being adjacent to each other and on one side of the alignment opening 102, the embossment 98 and alignment pin can be on opposite sides of the alignment opening 102. The spring finger 106 would need to be correspondingly altered such that the alignment opening 102 and fastener opening were on opposite sides of the spring finger 106. There also could be more than one alignment pin 100 and/or embossment 98. Each or both could be on opposite sides of the biased pin 92, with the spring finger 96 correspondingly altered.

Referring to FIG. 4, the receiver 64 is shown in greater detail where the shape of the lip 86 is more easily seen. The lip 86 is in the form of a hook 114 that defines a channel 116, which is shaped to receive the key 71 of the lug 68. Fasteners 118, such as bolts, are also shown securing the base 82 to the light housing 50. In the illustrated version of FIG. 4, the light housing 50 forms part of the receiver 64 in that it includes at least one catch 94 in the form of a catch opening 120 in the light housing 50. Three catch openings 120 are shown and they are spaced around a central opening 122.

The catch openings 120, lug openings 88, and lugs 68 are conveniently arranged or indexed such that the lugs 68 can be inserted into the lug openings 88 in any rotational alignment and the biased pin 92 will seat within one of the catch openings 120 upon the relative rotation of the motor housing 37 and the light housing 50.

Referring to FIG. 5, to assemble the light assembly 18 to the motor assembly 14, the light assembly 18 is aligned with the motor assembly 14 such that the lugs 68 are aligned with the lug openings 88. In this alignment, relative axial movement in a direction parallel to the rotational axis will result in the lugs 68 being passed through the lug openings 88 and the biased pin 92 will be deflected slightly in the same axial direction as it contacts the coupler, which in this case is a portion of the light housing. With the lugs 68 inserted into the lug openings 88 and the body 66 below the lip 86, which is referred to as an unlocked position, the coupler 62 and receiver 64 can be relatively rotated about the rotational axis, such as by relatively rotating the motor housing 37 and light housing 50, to move the lugs 68 under the lip 86 until one of stops 70 abuts an end of the lip 86 to stop 70 the relative rotation, which is referred to as a locked position. As the lugs 68 move into the locked position, the biased pin 92 is received within a corresponding one of the catch openings 120, which moves the latch assembly from an unlatched condition to a latched condition when the lugs 68 are on the locked position.

The unlocked, locked, latched, unlatched positions or conditions are used herein to describes relevant operational positions or conditions and are not meant to describe the only locations where a locking, unlocking, latching, or unlatching occurs. For example, in the case of the lock, a partial rotation of the lug 68 under the lip 86 will affect a locking of the light housing 50 to the motor housing 37. In the case of the latch assembly, the catch opening 120 might be sized sufficiently large such that the biased pin 92 is latched prior to the stop 70 abutting the lip 86. While the illustrated examples show the rotation in the locked position happening at the same time as the movement of the biased pin 92 into the latched condition, such coordination is not required.

Referring to FIG. 6, all of the components of the motor housing 37 have been removed to better illustrate the relative location of the coupler 62 and the receiver 64 in the locked position and latched condition. FIG. 7 is a sectional view along line 7-7 of FIG. 6 and illustrating the interaction of the elements in the locked position and latched condition.

The actuation of the biased pin 92 along an axis that is parallel to the rotational axis for assembly of the connection assembly 20 is beneficial over prior configurations. For example, while not shown in the drawings, the light assembly 18 can have one or more release passages that is/are aligned with the catch openings 120, thereby permitting the insertion of a tool, such as a screwdriver, to press the biased pin 92 out of the latched position and permit the rotation of the light assembly 18 from the locked to the unlocked position. With this configuration, the installer, often an inexperience consumer, can more easily access the biased pin 92 from a position below the light assembly 18. Prior designs had a bias pin that was biased along an axis perpendicular to the rotational axis, which would require the installer be able to access the side of the motor housing 37 or light housing 50, which requires the installer to be physically along the side of the motor/light housing than below. In low profile mount assemblies, there is often insufficient room for the installer to be physically beside the side of the assemblies without bumping into the ceiling or prevented from obtaining that position because of the ceiling. Additionally, components such as blade irons, blade rings, fitter housings, or other various components of a ceiling fan can prohibit radial access to the bias pin in previous designs requiring the consumer to disassemble portions of the fan in order to access the pin in able to depress and release it.

Another benefit to the biased pin axis being parallel vs. perpendicular to the rotational axis is that any lack of tolerance in the connection assembly 20 is not as likely to detrimentally impact the alignment of the biased pin 92 and catch opening 120 to the extent it would impact with latching. However, in a perpendicular orientation, such lack of tolerance can be great enough to prevent the alignment of the biased pin 92 and catch opening 120 and interfere with alignment because the radial spacing between the rotational axis and the catch opening 120 is much greater in a perpendicular orientation as compared to a parallel orientation.

Yet another benefit to the biased pin axis being parallel vs. perpendicular to the direction of installation is that the amount of force for installation is reduced. This makes installation by a consumer easier. When the pin was biased perpendicular to the direction of installation, the deflection of the pin was harder to obtain as the force applied to the pin was at a right angle to the direction of deflection that was needed to move the pin to allow installation.

While the connection assembly 20 is disclosed for illustration purposes as securing together the motor assembly 14 and light assembly 18, it can be used to secure together any of the assemblies and/or the various components of one or more of the assemblies, such as securing together the hanger bracket 24 and the mounting bracket 22 or the canopy 34 and one of the hanger bracket 24 or mounting bracket 22, or the downrod 26 and a component of the motor assembly 14, such as the motor adapter 28, stator 40, or motor shaft 42.

The ceiling fan assembly 10 can be sold in different commercially available kits. For example, a complete kit would include the mounting assembly 12, motor assembly 14, light assembly 18, blade set 16, and connection assembly 20. However, the connection assembly 20 could be commercially sold as a stand-alone kit. Other commercially available kits can be formed from subassemblies. For example, a light assembly 18 and connection assembly 20 could be sold as a commercial kit. Another kit would be the mounting assembly 12 with a connection assembly 20. Yet another kit would include the motor assembly 14 and the light assembly 18 along with the connection assembly 20. In short, any possible combination of the assemblies and/or the components of an assembly can be sold as a kit in combination with the connection assembly 20. It is contemplated that most kits would include specific written instructions for how to assemble the assemblies and/or components with the connection assembly 20. In all of the different commercially available kits, the different components of the mounting kit can be unassembled, pre-assembled, or a portion of them pre-assembled. The greater the degree of pre-assembly, the easier it will be on the consumer.

Throughout the disclosure, suitable fasteners are described for securing different components. Such fastener can be any type of fastener. In many cases the suitable fastener is a screw or a bolt. If a bolt, then the opening that the bolt is threaded into will be a tapped opening having complementary threads for receipt of the bolt.

While not shown in any of the drawings, a controller can be electrically coupled to a structure S electrical supply to control operation of the ceiling fan assembly 10. Alternatively, the controller can be wirelessly or communicatively coupled to the ceiling fan assembly 10, configured to control operation of the ceiling fan assembly 10 remotely, without a dedicated connection. Non-limiting examples of controls for the ceiling fan assembly 10 can include fan speed, fan direction, or light operation. Furthermore, a separate wireless controller, alone or in addition to the wired controller, can be communicatively coupled to a controller or a wireless receiver in the ceiling fan assembly 10 to control operation. It is further contemplated in one alternative example that the ceiling fan assembly 10 be operated by the wireless controller alone and is not operably coupled with the wired controller.

To the extent not already described, the different features and structures of the various features can be used in combination as desired. That one feature is not illustrated in all of the aspects of the disclosure is not meant to be construed that it cannot be but is done for brevity of description. Thus, the various features of the different aspects described herein can be mixed and matched as desired to form new features or aspects thereof, whether or not the new aspects or features are expressly described. All combinations or permutations of features described herein are covered by this disclosure.

This written description uses examples to detail the aspects described herein, including the best mode, and to enable any person skilled in the art to practice the aspects described herein, including making and using any devices or systems and performing any incorporated methods. The patentable scope of the aspects described herein are defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A ceiling fan assembly for mounting to a structure, the ceiling fan assembly comprising:
   a motor assembly comprising a stationary motor shaft and a rotor rotationally coupled to the stationary motor shaft for rotation about a rotational axis;
   a set of blades operably coupled to the rotor;
   a mounting assembly for securing the motor assembly to the structure;
   a light assembly; and
   a bayonet mount assembly comprising:
     a receiver carried by the light assembly,
     a coupler carried by the stationary motor shaft, wherein the coupler and receiver are relatively rotated with each other between an unlocked position and a locked position about a first axis generally parallel to the rotational axis, and
     a detent latch having a catch carried by the light assembly and a biased pin, which is moveable in an axial direction along a second axis that is substantially parallel to the first axis and is received in the catch in the locked position.

2. The ceiling fan assembly of claim 1 wherein the detent latch further comprises a spring finger mounted to the coupler and carrying the biased pin.

3. The ceiling fan assembly of claim 2 wherein the spring finger is mounted to the coupler on an obverse side relative to the receiver.

4. The ceiling fan assembly of claim 3 wherein the coupler further comprises an embossment on the obverse side and the spring finger is secured to the embossment.

5. The ceiling fan assembly of claim 4 wherein the coupler further comprises an alignment pin and the spring finger has an alignment opening receiving the alignment pin.

6. The ceiling fan assembly of claim 5 wherein the alignment pin is adjacent the embossment.

7. The ceiling fan assembly of claim 3 wherein the coupler comprises a through opening and the biased pin extends through the through opening and is accessible to the catch.

8. The ceiling fan assembly of claim 7 wherein the through opening and catch are indexed relative to the locked position such that the biased pin is received in the catch in the locked position.

9. The ceiling fan assembly of claim 8 wherein the coupler comprises a body having spaced lugs and the receiver at least partially defines a channel having spaced lug openings, which receive the spaced lugs in the unlocked position.

10. The ceiling fan assembly of claim 9 wherein at least one of the spaced lugs has a rotational stop that contacts the receiver to stop the relative rotation of the coupler and the receiver.

11. The ceiling fan assembly of claim 10 wherein the stop is indexed relative to the locked position such that the stop makes contact with the receiver in the locked position.

12. The ceiling fan assembly of claim 11 wherein the receiver defines the channel in combination with the light assembly.

13. A ceiling fan assembly comprising:
a motor assembly comprising a rotor;
a set of blades operably coupled to the rotor;
a mounting assembly;
a light assembly; and
a bayonet mount assembly coupling the motor assembly and the light assembly upon relative rotation between an unlocked position and a locked position about a first rotational axis and having a detent latch with a biased pin moveable in a direction along a second axis that is substantially parallel to the first rotational axis.

14. The ceiling fan assembly of claim 13 wherein the bayonet mount further comprises a receiver, carried by one of the motor assembly or light assembly, and a coupler, carried by the other of the motor assembly or light assembly.

15. The ceiling fan assembly of claim 14 wherein the receiver defines a channel with at least one lug opening and the coupler comprises at least one lug, which is inserted into the channel through a corresponding lug opening of the at least one lug opening, and the relative rotation about the first rotational axis moves a lug of the least one lug through the channel.

16. The ceiling fan assembly of claim 15 wherein the at least one lug comprises a stop that contacts a portion of the receiver at the locked position to stop further relative rotation.

17. The ceiling fan assembly of claim 14 wherein the biased pin is carried by one of the receiver or coupler.

18. The ceiling fan assembly of claim 17 wherein the detent latch comprises a catch carried by the other of the receiver or coupler, and the biased pin is received within the catch in the locked position.

19. The ceiling fan assembly of claim 18 wherein a portion of one of the motor assembly and light assembly forms a portion of the receiver having the catch.

20. The ceiling fan assembly of claim 19 wherein the biased pin passes through an opening in the coupler.

* * * * *